(12) United States Patent
Lee et al.

(10) Patent No.: US 11,932,980 B2
(45) Date of Patent: Mar. 19, 2024

(54) WASHING MACHINE HAVING LOWER BALANCER

(71) Applicant: LG Electronics Inc., Seoul (KR)

(72) Inventors: Changwon Lee, Seoul (KR); Youngjong Kim, Seoul (KR); Insik Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/774,713

(22) PCT Filed: Oct. 13, 2020

(86) PCT No.: PCT/KR2020/013921
§ 371 (c)(1),
(2) Date: May 5, 2022

(87) PCT Pub. No.: WO2021/091106
PCT Pub. Date: May 14, 2021

(65) Prior Publication Data
US 2022/0396906 A1    Dec. 15, 2022

(30) Foreign Application Priority Data

Nov. 5, 2019  (KR) .......................... 10-2019-0140152

(51) Int. Cl.
*D06F 37/24*    (2006.01)
*D06F 37/12*    (2006.01)

(52) U.S. Cl.
CPC ............ *D06F 37/245* (2013.01); *D06F 37/12* (2013.01)

(58) Field of Classification Search
CPC .............................. D06F 37/245; D06F 37/12
See application file for complete search history.

(56) References Cited

U.S. PATENT DOCUMENTS

| | | | | |
|---|---|---|---|---|
| 5,761,933 A | * | 6/1998 | Kim ...................... | D06F 37/245 74/572.4 |
| 2012/0144875 A1 | * | 6/2012 | Kim ...................... | D06F 37/245 68/13 R |
| 2013/0167596 A1 | * | 7/2013 | Kang .................... | D06F 37/245 68/12.06 |
| 2013/0227994 A1 | * | 9/2013 | Naber ..................... | D06F 37/12 68/13 R |
| 2013/0233028 A1 | * | 9/2013 | Naber ................... | D06F 37/245 74/572.4 |

(Continued)

FOREIGN PATENT DOCUMENTS

| CN | 102362027 | 2/2012 |
|---|---|---|
| CN | 107201627 | 9/2017 |

(Continued)

OTHER PUBLICATIONS

Office Action in Chinese Appln. No. 202080076650.8, dated Mar. 18, 2023, 4 pages.

(Continued)

*Primary Examiner* — Joseph L. Perrin
(74) *Attorney, Agent, or Firm* — Fish & Richardson P.C.

(57) ABSTRACT

A washing machine includes a lower balancer assembled by a fastening member that connects a hub and tub base, thereby reducing manufacturing process and manufacturing cost. The fastening member passes through the tub base and the lower balancer and is coupled to the hub.

20 Claims, 11 Drawing Sheets

(56) References Cited

U.S. PATENT DOCUMENTS

| | | | |
|---|---|---|---|
| 2013/0312464 A1* | 11/2013 | Davis | D06F 37/245 74/573.1 |
| 2015/0121968 A1* | 5/2015 | Kim | D06F 37/24 68/23.2 |
| 2016/0069011 A1* | 3/2016 | Lee | D06F 37/245 68/132 |
| 2016/0145789 A1* | 5/2016 | Kim | D06F 37/245 74/572.4 |

FOREIGN PATENT DOCUMENTS

| | | |
|---|---|---|
| JP | H08323091 | 12/1996 |
| KR | 20110012365 | 2/2011 |
| KR | 20110051017 | 5/2011 |
| KR | 10-2015-0052454 | 5/2015 |
| KR | 10-2016-0029518 | 3/2016 |
| KR | 20160029517 | 3/2016 |
| WO | WO 2016/036216 | 3/2016 |

OTHER PUBLICATIONS

International Search Report in International Appln. No. PCT/KR2020/013921, dated Dec. 21, 2020, 6 pages (with English translation).
Extended European Search Report in European Appln. No. 20885670.8, dated Nov. 7, 2023, 10 pages.

* cited by examiner

WASHING MACHINE HAVING LOWER BALANCER

CROSS-REFERENCE TO RELATED APPLICATIONS

This application is a National Stage application under 35 U.S.C. § 371 of International Application No. PCT/KR2020/013921, filed on Oct. 13, 2020, which claims the benefit of Application No. 10-2019-0140152, filed on Nov. 5, 2019. The disclosures of the prior applications are incorporated by reference in their entirety.

TECHNICAL FIELD

The present disclosure relates to a washing machine, and more particularly, to a top loading washing machine that can reduce a number of parts and simplify a manufacturing process by using a fastening structure coupling a tub base, a lower balancer, and a hub.

BACKGROUND

A washing machine is a device that washes laundry using the emulsification effect of a detergent, the water flow action generated by the rotation of a washing tub or washing wings, the impacts applied by the washing wings, and the like. For example, the washing machine can perform a washing cycle, a rinsing cycle or a spin-drying cycle to remove contamination from the laundry using the action of detergent and water.

A washing machine can be divided into a top loading type and a front loading type according to the position of an inlet to which laundry is put. For example, the top loading washing machine has an inlet in a vertical direction, and the front loading washing machine has an inlet in a front-rear direction.

In some cases, a top loading washing machine can include an inner tub assembly including an outer tub to store wash water, a drum disposed inside the outer tub and loaded with laundry for washing, and a driving device disposed under the outer tub to rotate the drum.

In some cases, upper and lower balancers are mounted on the upper and lower portions of the drum to reduce vibrations generated due to the eccentricity of laundry during washing, rinsing, and spin-drying cycles.

A balancer can be divided into a fluid balancer and a ball balancer according to the type of a vibration reducing mass body. For example, the fluid balancer can be used in consideration of transmission performance and noise generation.

In some cases, a lower balancer is installed on the lower side of a drum using an additional means for fixing the lower balancer to the drum.

For instance, a top loading washing machine may include a lower balancer coupled and fastened to a hub member configured to receive power transmitted from a motor, where the lower balancer and the hub member forms an assembly, and then the assembly is attached to a drum base member using a separate fastening member.

In some cases, the lower balancer may go through an additional fastening process for fixing the assembly of the hub member and the lower balancer to the drum base member using a separate fastening member, in addition to the fastening process for fixing the lower balancer to the hub member.

Therefore, due to the additional fastening means and fastening process for fastening the lower balancer to the lower portion of the drum, overall manufacturing time and manufacturing cost of the washing machine may be increased.

SUMMARY

The present disclosure describes a top loading washing machine that can reduce the manufacturing process steps and manufacturing cost by assembling a lower balancer using a fastening structure that connects a hub and tub base without adding a fastening member for fastening the lower balancer to another hub member. According to one aspect of the subject matter described in this application, a washing machine includes a drum configured to receive laundry, a tub base fixed to a lower portion of the drum, a lower balancer coupled to an outer circumferential surface of the tub base and configured to reduce vibration generated by rotation of the drum, a hub coupled to a lower surface of the tub base and disposed radially inside the lower balancer, and a fastening member that couples the tub base, the lower balancer, and the hub.

Implementations according to this aspect can include one or more of the following features. For example, the fastening member comprises a fastening bolt, the fastening bolt comprising a head portion and a body portion, where the body portion has a male thread defined on an outer circumferential surface thereof. In some examples, the tub base can include a disk portion having a through hole that receives the body portion of the fastening bolt. In some examples, the tub base can further include a reinforcement bead that protrudes downward from the disk portion toward the hub and a connection bead that protrudes downward from the reinforcement bead toward the hub and defines the through hole.

In some examples, the lower balancer can include a fluid balancer that has one or more annular cavities configured to guide fluid. In some examples, the fastening member can pass through the tub base and the lower balancer and be coupled to the hub.

In some implementations, the lower balancer can include a fastening tab that extends radially inward from an inner circumferential surface of the lower balancer, where the fastening tab defines a connection hole that receives at least a part of the connection bead. In some examples, the hub can define a fastening hole having a female thread engaged with the male thread of the body portion, and the head portion can be configured to, based on the fastening bolt coupling the tub base, the lower balancer, and the hub, press an upper surface of the connection bead to thereby enable a lower surface of the connection bead to be in direct contact with an upper surface of the hub.

In some examples, the fastening tab can include an inclined surface that is disposed at a radially inner end of the fastening tab and is in contact with the lower surface of the connection bead, where the inclined surface of the fastening tab has a shape corresponding to the lower surface of the connection bead. In some implementations, the washing machine can further include a washer disposed between the head portion and the upper surface of the connection bead and configured to restrict movement of the fastening bolt.

In some implementations, a first depth of the reinforcement bead protruding downward from the disk portion can be greater than a second depth of the connection bead protruding downward from the reinforcement bead. In some examples, a height from the upper surface of the connection bead to an upper surface of the head portion can be less than a sum of the first depth and the second depth. In some examples, a height from the upper surface of the connection bead to an upper surface of the head portion can be less than the first depth. In some examples, the head portion can be in direct contact with the upper surface of the connection bead. In some examples, a height of the head portion in a longitudinal direction of the fastening bolt can be less than the second depth.

In some implementations, the washing machine can further include an upper balancer fixed to an upper end of the drum, where each of the upper balancer and the lower balancer can include a fluid balancer configured to accommodate fluid. For instance, the fluid balancer can have one or more annular cavities configured to guide the fluid.

In some implementations, an upper surface of the reinforcement bead can be recessed downward from an upper surface of the disk portion such that a lower surface of the reinforcement bead protrudes downward relative to a lower surface of the disk portion. An upper surface of the connection bead can be recessed downward from the upper surface of the reinforcement bead such that a lower surface of the connection bead protrudes downward relative to the lower surface of the reinforcement bead. In some examples, a first depth of the reinforcement bead recessed downward from the disk portion can be greater than or equal to a second depth of the connection bead recessed downward from the reinforcement bead.

DETAILED DESCRIPTION

Hereinafter, one or more implementations of the present disclosure will be described in detail with reference to the accompanying drawings.

Figure 1:
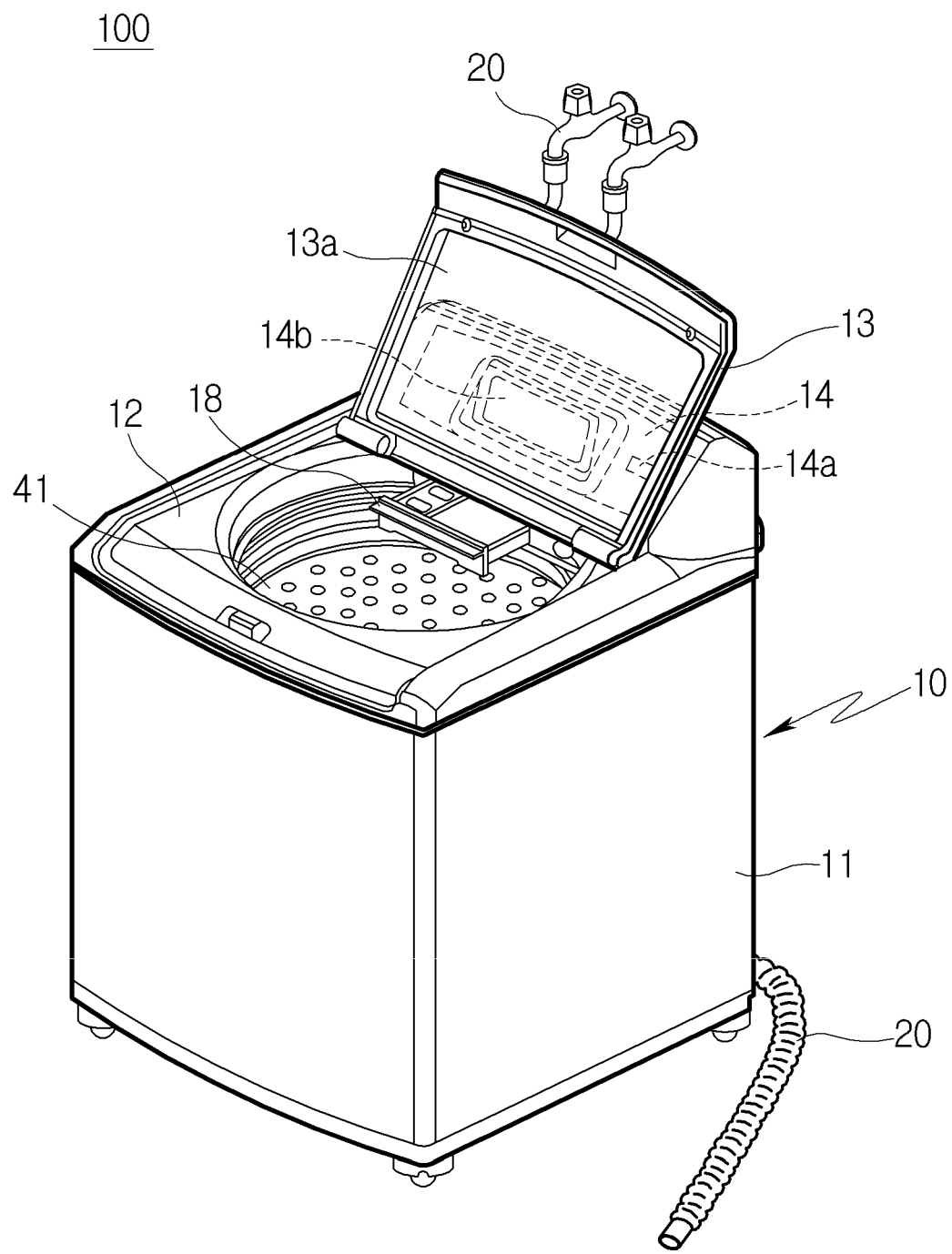
FIG. 1 is a perspective view showing an example of a washing machine.

FIG. 1 is a perspective view illustrating an example of a washing machine 100.

In some implementations, referring to FIG. 1, the washing machine 100 can include a casing 10 that defines an exterior of the washing machine 100, an outer tub disposed inside the casing 10 and configured to receive wash water, an inner tub assembly 40 that is disposed inside the outer tub and includes a drum 41 configured to receive laundry to be washed, a driving unit mounted on the outer tub and configured to rotate the drum 41, and a water supply unit and a drain unit that are configured to supply and drain the wash water, respectively.

In some implementations, the casing 10 can include a top cover 12 which has an inlet on the upper side thereof so that laundry can be put in in a vertical direction, a cabinet 11 which is connected to the top cover 12, and in which the outer tub, the inner tub assembly 40 and the driving unit are installed, and a door 13 which is installed on the top cover 12 and opens and closes the inlet.

In some implementations, a transparent window 13a can be disposed on the door 13 so that the inside of the drum 41 can be observed. In some examples, a control panel 14 can be installed on the top cover 12. For example, the control panel 14 can include an input unit 14a to which a control command for controlling the operation of the washing machine 100 is input from a user, and a display unit 14b to notify the user of the operating state of the washing machine 100.

The input unit 14a can include a button, a dial, a touch pad and the like, and the display unit 14b can include a liquid crystal display (LCD), light emitting-diode (LED) display device, or the like.

In some implementations, the top cover 12 can include a drawer housing which removably accommodates a drawer 18 configured to store detergent and to supply the detergent during the washing and rinsing cycles. For example, an inside of the drawer 18 can be partitioned into a plurality of spaces to store detergents by type. Therefore, laundry detergent, fabric softener, bleach and the like can be separately stored in the plurality of partitioned spaces without mixing with each other.

The water supply unit can include a water supply pipe, a water supply valve, and a dispenser. For example, the water supply pipe can be configured to guide the wash water supplied to the inside of the washing machine 100 from an external water supply source 20 such as a faucet. The water supply valve can be configured to control the supply of wash water by opening and closing the water supply pipe. In some examples, the wash water passing through the control valve can be selectively distributed for each space partitioned in the drawer 18 through the dispenser. The wash water distributed through the dispenser can be mixed with detergent through the drawer 18 and then supplied to the outer tub.

In some examples, the drain unit includes a drain pipe, a drain valve and a drain pump. For example, the drain pipe can be connected to the outer tub and configured to discharge wash water to the outside, and the drain valve can be configured to open and close the drain pipe to control the discharge of wash water.

The wash water discharged when the drain valve is opened is pressurized by the drain pump and discharged to the outside through a drain hose 30. The driving unit can include an electric motor, a reduction mechanism and a driving shaft, and is fixed to the lower surface of the outer tub. The driving motor provides a driving force for rotations of the drum 41 and a pulsator 50. For example, the driving motor can be an outer rotor type brushless direct current (BLDC) motor. The detailed configuration of the driving motor is omitted in this application.

The reduction mechanism serves to convert the rotational force of the driving motor into two outputs rotated in opposite directions. For example, the reduction mechanism can includes a planetary gear assembly including one or more gears. The rotational force reduced through the planetary gear assembly is transmitted to the driving shaft.

The driving shaft includes a dual shaft structure having an inner shaft and an outer shaft. One end of the inner shaft extends through the outer shaft and the tub base 42 and is coupled to the pulsator 50, and the other end of the inner shaft extends downward and is connected to the reduction mechanism.

The outer shaft is manufactured in a tubular shape with a hollow, and the inner shaft is inserted into the hollow. The outer shaft passes through the lower side of the outer tub and is coupled to the spline boss 451a of the hub 45.

In order to transmit a driving force to the hub 45 through the outer shaft, the outer shaft and the hub 45 can be spline-coupled. For example, teeth (FIG. 11) are formed on the inner peripheral surface of the spline boss 451a. Therefore, the driving motor can selectively drive at least one of the drum 41 and the pulsator 50 or simultaneously drive the drum 41 and the pulsator 50 through the inner shaft and the outer shaft. Detailed description of selective driving and simultaneous driving is omitted.

The outer tub stores the wash water and is supported by the cabinet 11 through a suspension module. The suspension module cushions the transmitted vibration or shock generated by the outer tub. The inner tub assembly 40 is disposed inside the outer tub, and can be rotated in a forward or reverse direction by a rotational force transmitted from the driving unit.

Hereinafter, an assembly including the drum 41, an upper balancer 43, a tub base 42, a lower balancer 44, and a hub 45 will be defined as the inner tub assembly 40 and will be described in detail.

Referring to FIGS. 2 to 5, in some implementations, the inner tub assembly 40 can include the drum 41, the upper balancer 43 provided at the upper end of the drum 41, the tub base 42 fixed to the lower end of the drum 41, the lower balancer 44 coupled to the outside of the tub base 42, the hub 45 fixed to the lower surface of the tub base 42, and an integrated fastening member to fasten the tub base 42, the lower balancer 44, and the hub 45 to each other at the same time. For instance, the integrated fastening member can a single part (e.g., a bolt) that passes through all of tub base 42, the lower balancer 44, and the hub 45.

In some implementations, the drum 41 can be manufactured by processing a lightweight metal plate, for example, an aluminum plate, into a cylindrical shape, and the drum 41 can include a plurality of through holes 41h. The wash water flows into the drum 41 from the outer tub through the plurality of through holes 41h, or the wash water is discharged from the drum 41 to the outer tub.

The tub base 42 corresponds to a portion fixed to the lower end of the drum 41 and can be manufactured by press-processing of a metal plate. In some implementations, the tub base 42 can include a disk portion 421, a step portion 422, and an enlarged diameter portion 423. For example, the disk portion 421 is formed in a ring shape with a center hole 421h in the center. The wash water is discharged through the center hole 421h, and the above-described driving shaft extends therethrough.

A plurality of reinforcement beads 421a-1, 421a-2 is formed in the disk portion 421 through press-processing. The plurality of reinforcement beads 421a-1, 421a-2 serves to reinforce the rigidity of the disk portion 421 and is formed to protrude downward. That is, the beads can refer to a recess or a protrusion.

When the reinforcement beads 421a-1, 421a-2 are formed in the upper direction of the disk portion 421, the laundry accommodation space formed by the tub base 42 and the drum 41 is reduced, and accordingly, the washing capacity of the washing machine 100 can be limited. Therefore, in some implementations, the reinforcement beads 421a-1, 421a-2 are defined to protrude downward so that the washing capacity of the washing machine 100 is not limited.

In addition, since these reinforcement beads 421a-1, 421a-2 protrude downward, the washing water can be accumulated. Therefore, in order to prevent the washing water from accumulating, a drain hole 421ah is formed in the individual reinforcement beads 421a-1, 421a-2.

In some examples, at least one of the reinforcement beads 421a-1 and 421a-2 is formed with a connection bead 421b that is formed to further protrude downward from the reinforcement bead 421a-2.

The connection bead 421b acts as a locking portion that is at least partially inserted into the connection hole 442bh formed in the fastening tab 442b of the lower balancer 44 to be described later.

Based on the illustrated implementation, a total of six connection beads 421b are formed at equal intervals. Although the present disclosure is not limited thereto, it will be described based on a configuration in which a total of six connection beads 421b are formed at equal intervals by way of example.

Figure 9:
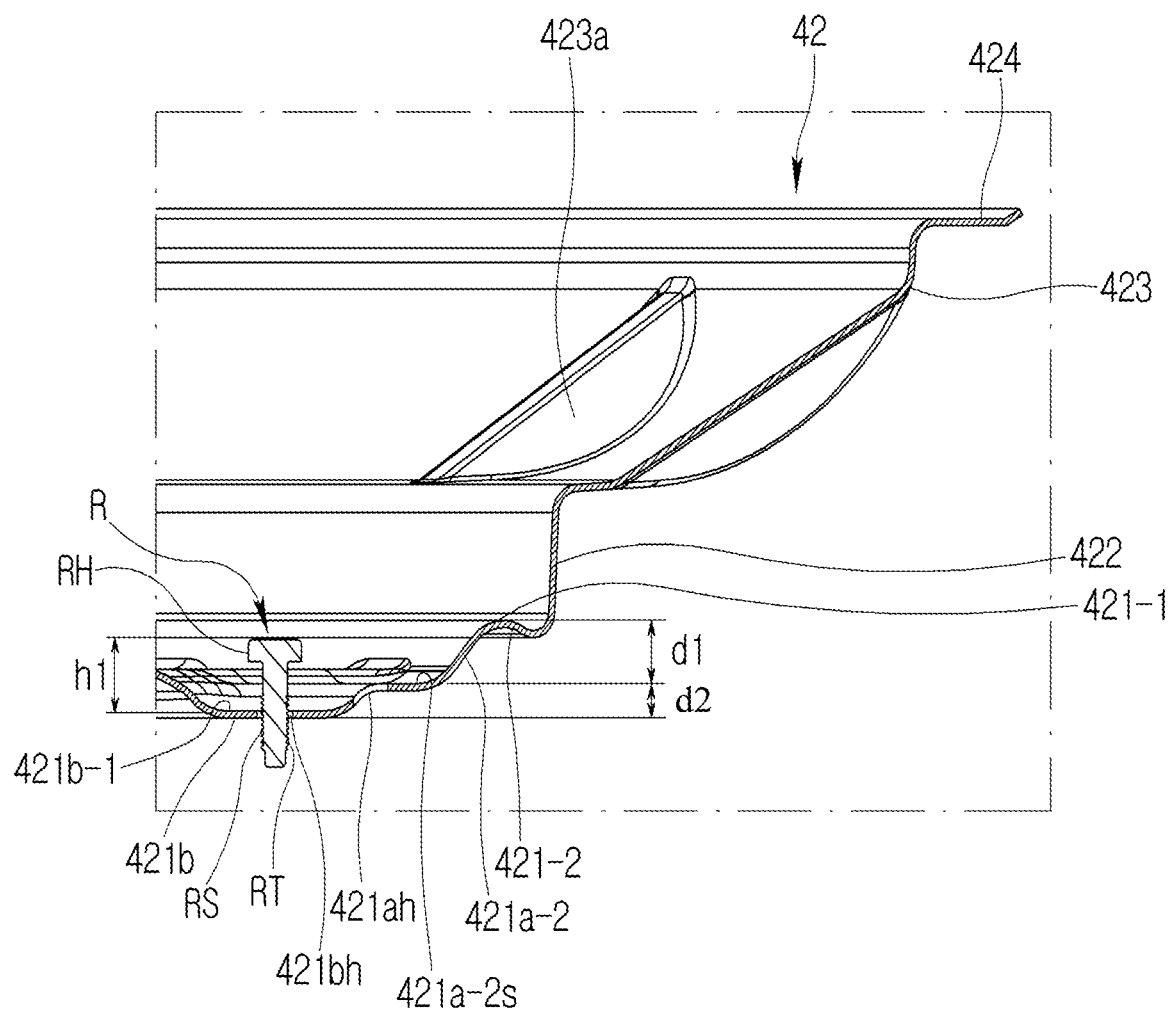
FIG. 9 is a bottom view showing the tub base and the lower balancer that are assembled.
Figure 10:
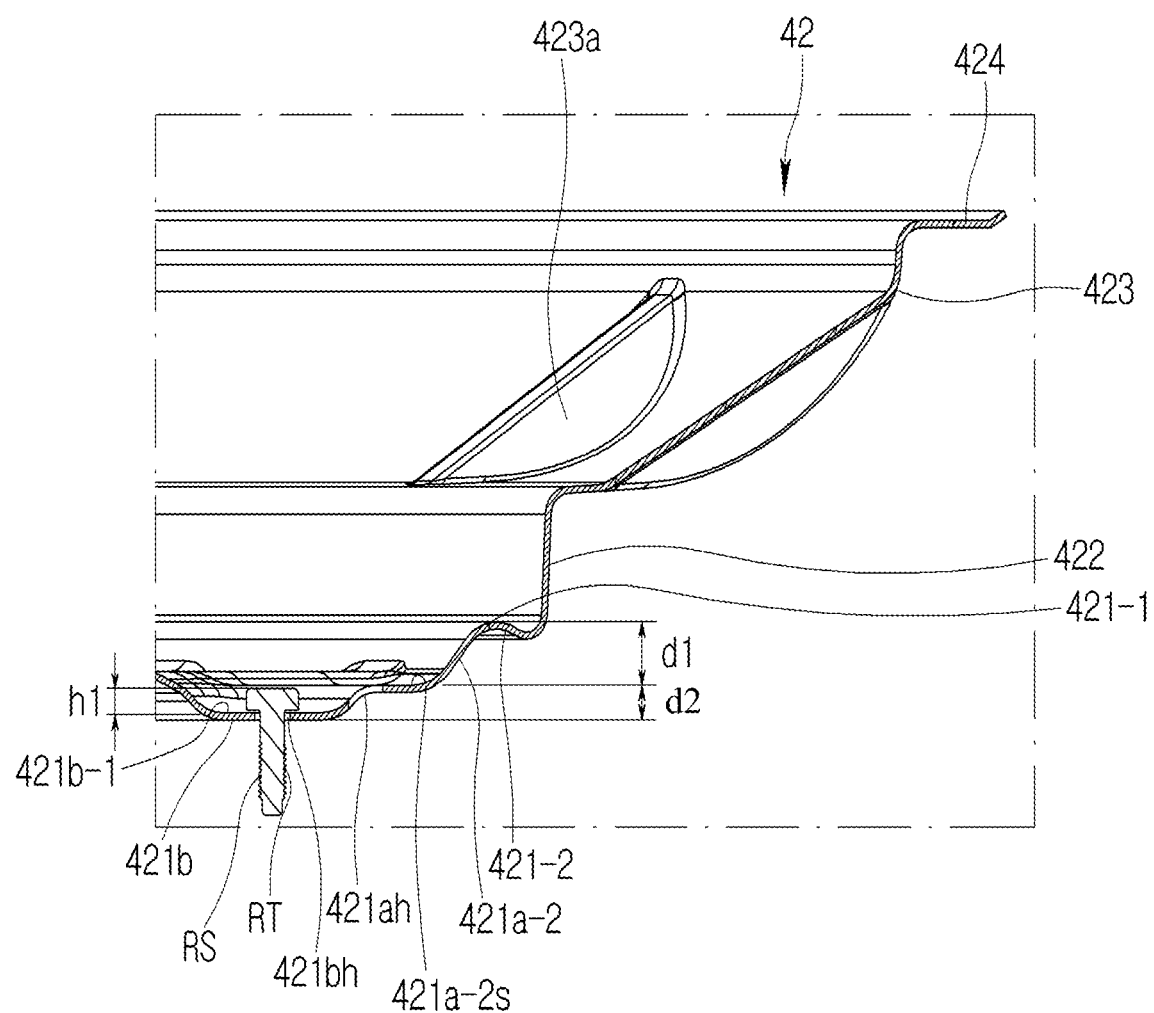
FIG. 10 is a plan view and a partially enlarged view of the lower balancer.

As shown in FIGS. 9 and 10, the reinforcement bead 421a-2 can protrude from the upper bottom surface 421-1 of the disk portion 421 to have a first depth (d1), and the connection bead 421b can protrude from the upper bottom surface 421a-2s of the reinforcement bead 421a-2 to have a second depth (d2).

The first depth (d1) and the second depth (d2) can be the same or different from each other.

For example, in some implementations, the second depth (d2) can be smaller than the first depth (d1).

In some cases, where the second depth (d2) exceeds the first depth (d1), the height of the inner tub assembly 40 can be increased.

The relationship between the first depth (d1) of the reinforcement bead 421a-2 and the second depth (d2) of the connection bead 421b can be further specified with respect to the height of the head portion (RH) of the fastening bolt (R) as an integrated fastening member to be described later. Details will be described later.

In some examples, the through hole 421bh is formed in the individual connection beads 421b. The body portion (RS) of the fastening bolt (R) passes through the through hole 421bh.

The step portion 422 is a portion formed by press-processing so as to be bent upward from the disk portion 421, and is integrally formed with the disk portion 421.

Figure 2:
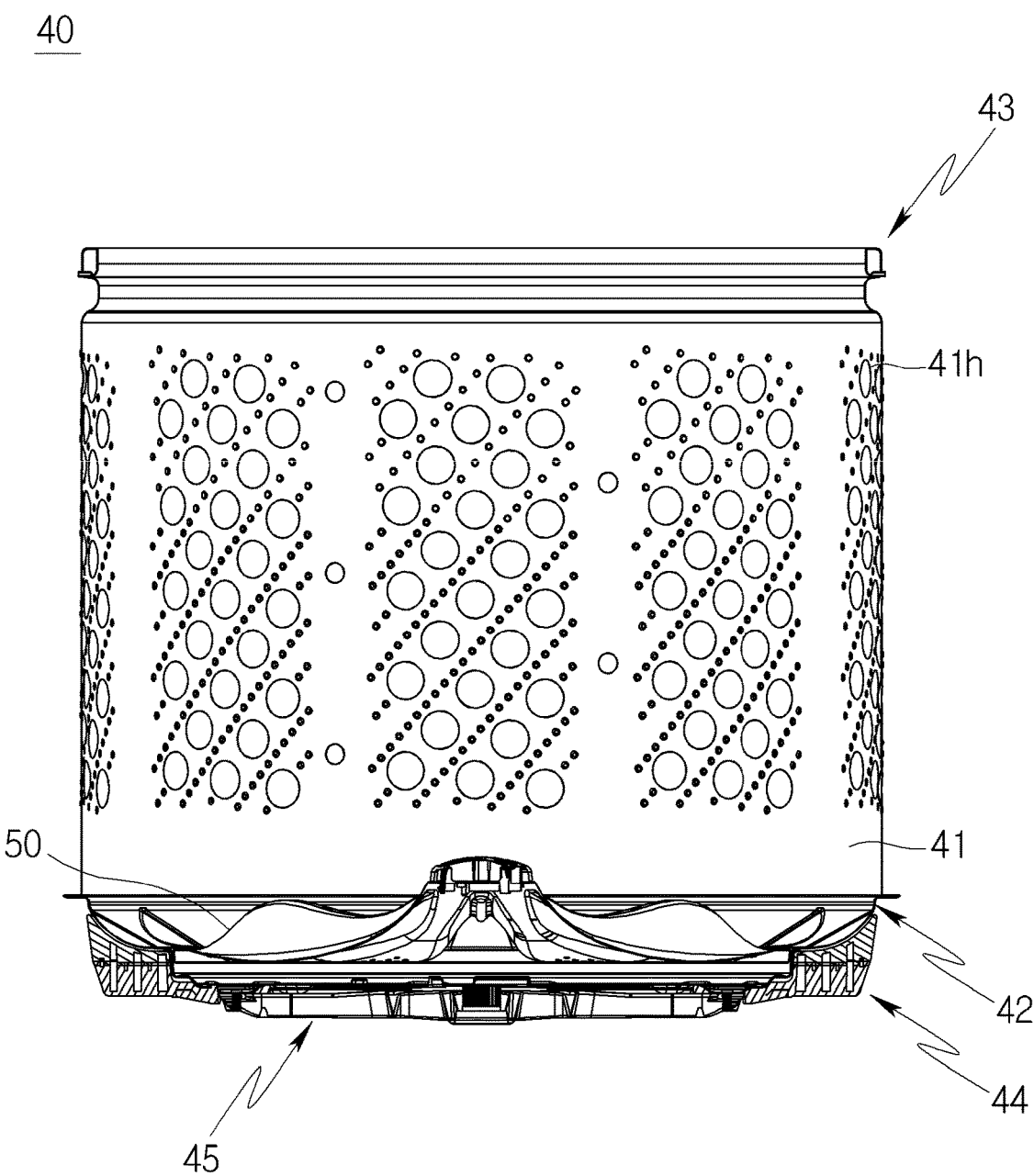
FIG. 2 is a front cross-sectional view showing an example of an inner tub assembly of the washing machine.

As shown in FIG. 2, the step portion 422 internally forms a mounting space for at least partially accommodating the pulsator 50 together with the disk portion 421.

In addition, the step portion 422 externally comes into contact with the annular locking protrusion 442a of the lower balancer 44 to be described later. Accordingly, the contact area between the tub base 42 and the lower balancer 44 can be increased.

Through this, the load transferred from the tub base 42 to the lower balancer 44 is distributed to prevent the lower balancer 44 from being damaged.

The enlarged diameter portion 423 is a portion in which the inner diameter is expanded and extended from the upper end of the step portion 422.

Figure 3:
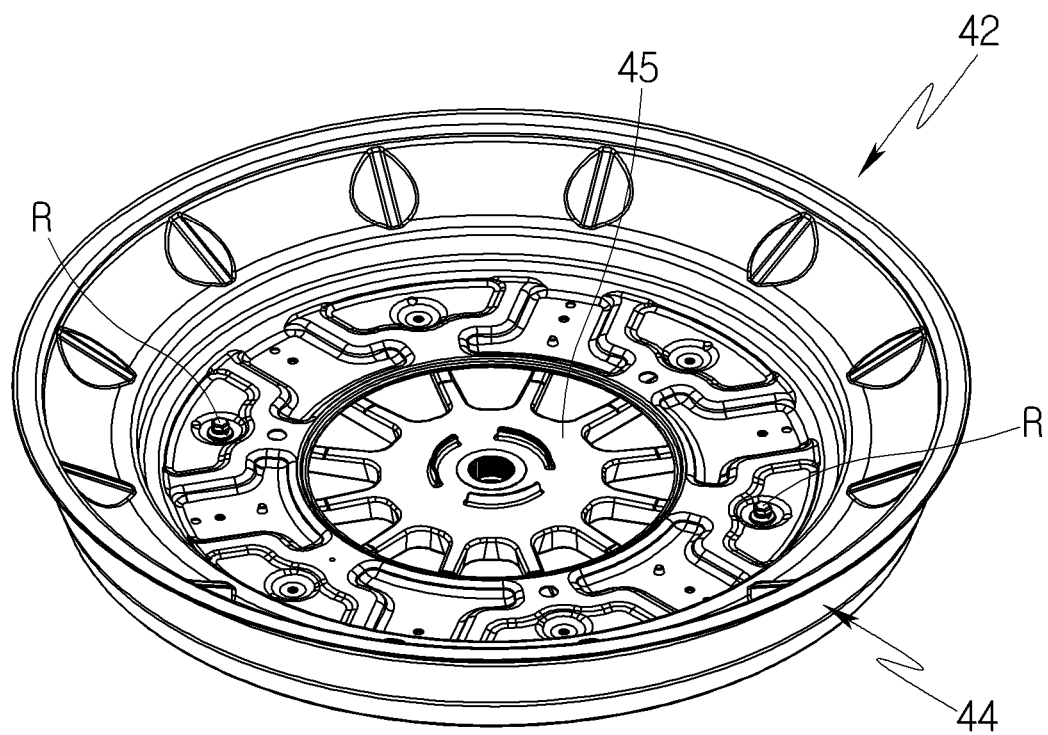
FIG. 3 is a perspective view illustrating an example of a tub base, a lower balancer, and a hub of the inner tub assembly that are assembled.
Figure 4:
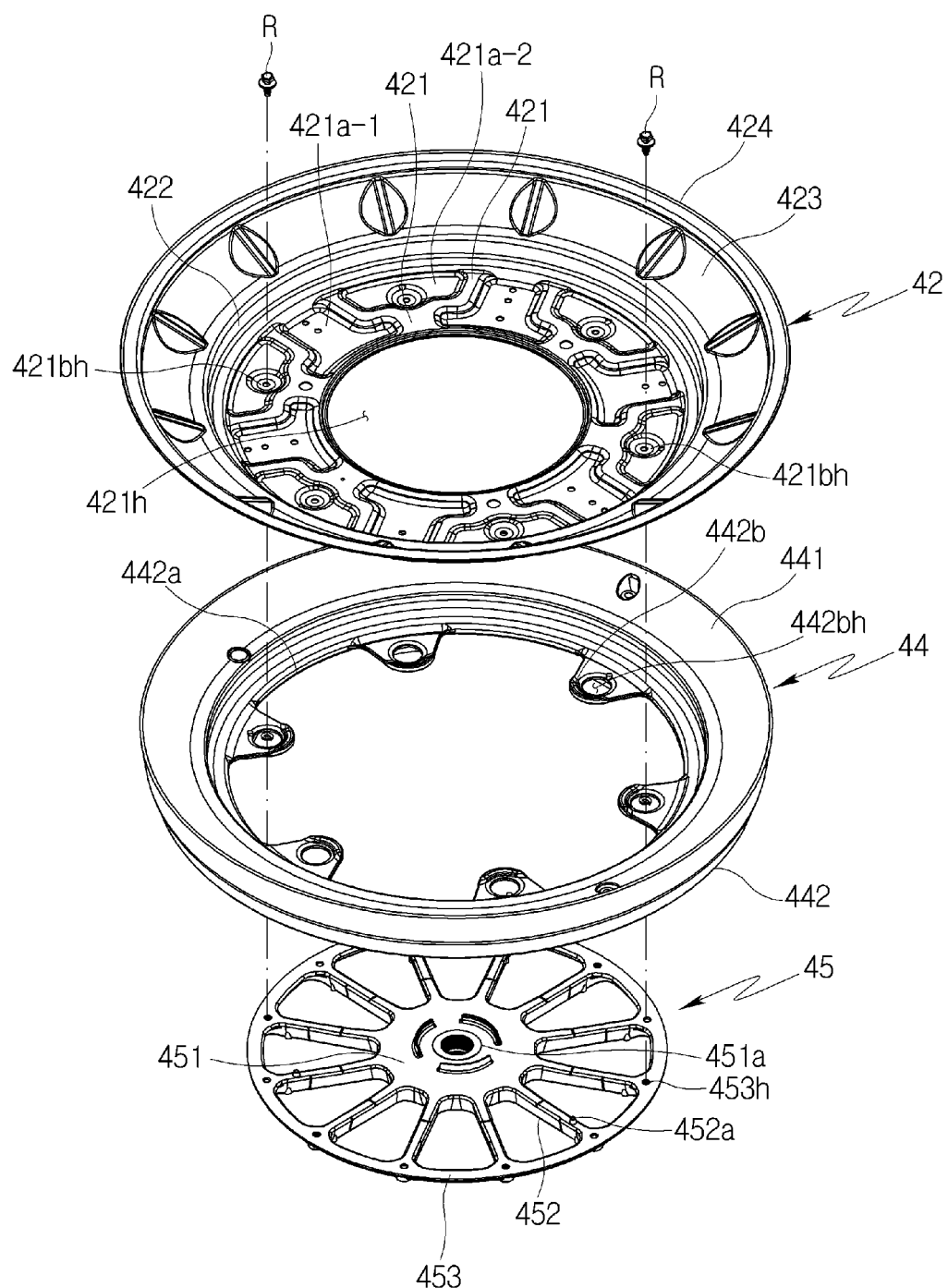
FIG. 4 is an exploded perspective view of FIG. 3.
Figure 5:
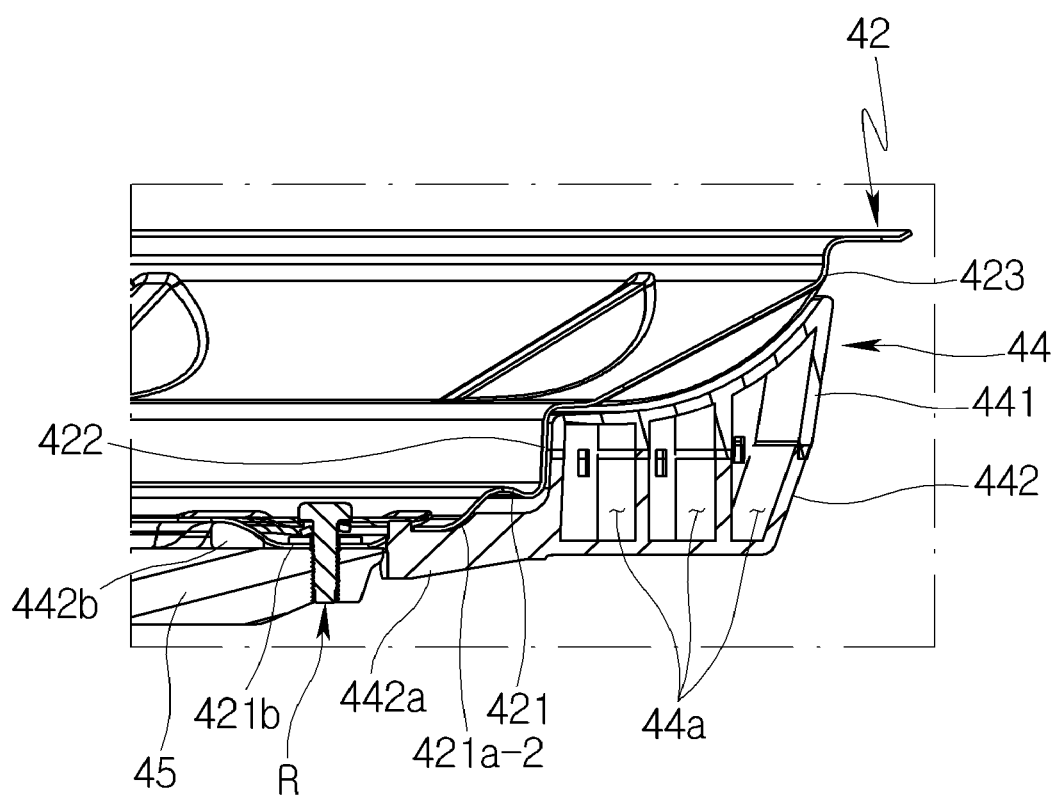
FIG. 5 is a partial cross-sectional view of FIG. 4
Figure 6:
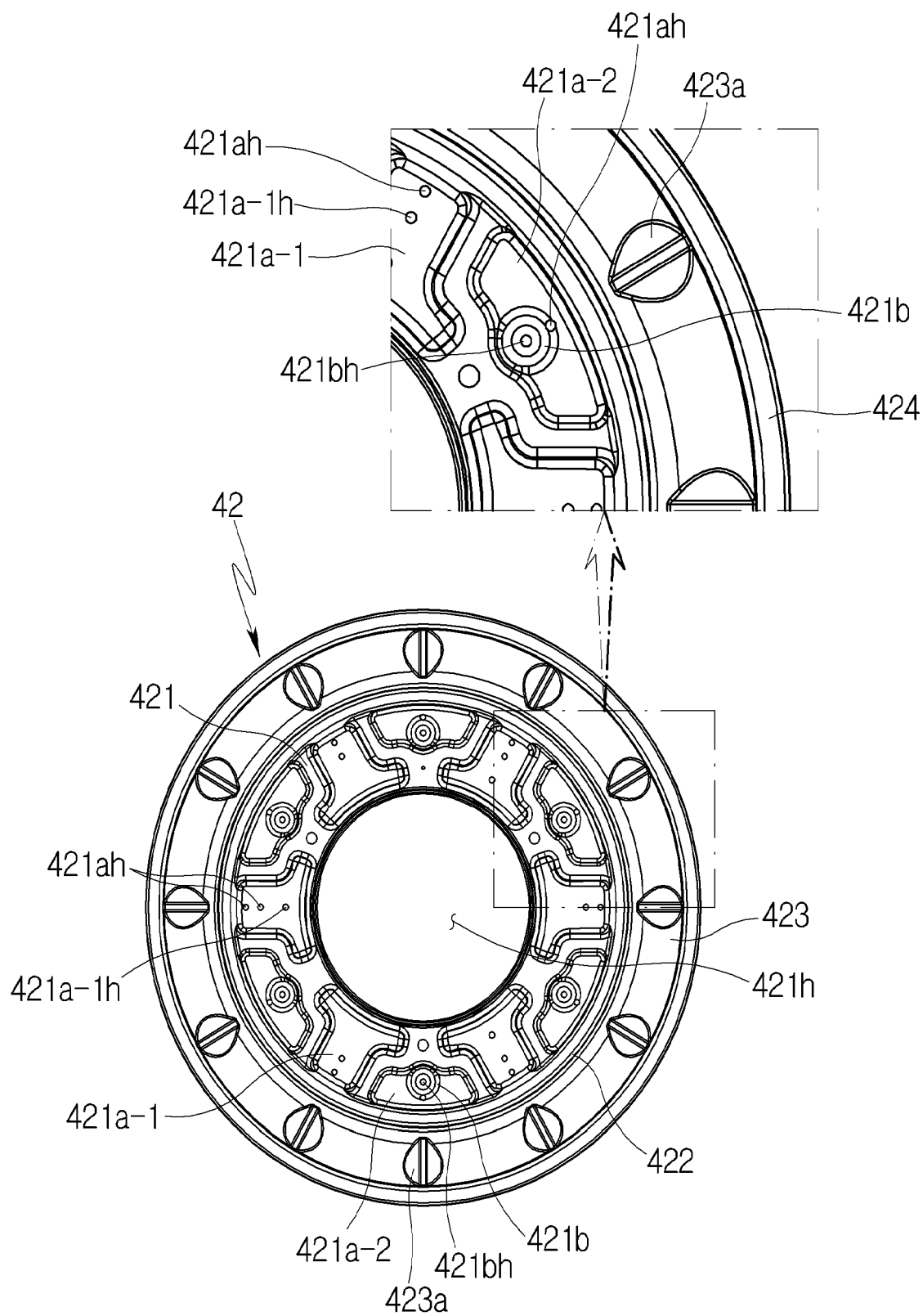
FIG. 6 is a plan view and a partially enlarged view of an example of the tub base.

In more detail, as shown in FIGS. 3 to 5, the enlarged diameter portion 423 is a portion expanded from the upper end of the step portion 422, and is formed of inner and outer surfaces having a predetermined curvature, and a downwardly convex curved surface.

The enlarged diameter portion 423 is integrally formed with the step portion 422 through press-processing.

A reinforcement bead 423a can be formed in the enlarged diameter portion 423 similarly to a flat plate portion. The reinforcement bead 423a of the enlarged diameter portion 423 is formed to protrude toward the inside of the drum 41 in an upward direction, unlike the reinforcement beads 421a-1, 421a-2 of the flat plate portion. This is to reinforce the strength of the enlarged diameter portion 423 and at the same time, to form a water flow when the inner tub assembly 40 rotates.

The upper end of the enlarged diameter portion 423 forms a coupling portion 424 which is firmly fixed to the lower end of the drum 41 by welding and curling.

In some examples, the outer surface of the enlarged diameter portion 423 forms a space in which the lower balancer 44 is mounted.

As shown in FIGS. 4 and 5, the lower balancer 44 is coupled to the tub base 42 in a simple fitting manner while moving upward in a space having a shape defined by the step portion 422 and the enlarged diameter portion 423.

Therefore, through such a simple fitting coupling, the temporary assembly state can be maintained without the use of a separate jig until the hub 45 to be described later is fastened to the lower surface of the tub base 42.

In some examples, the upper balancer 43 and the lower balancer 44, as fluid balancers, serve to reduce the vibrations generated when the inner tub assembly 40 rotates.

In some implementations, each of the upper balancer 43 and the lower balancer 44 can includes at least one annular cavity 44a defining a movement path of the liquid moving due to the eccentricity of the inner tub assembly 40 for vibration reduction. In some examples, the upper balancer 43 can be fixed to the upper end of the drum 41. For example, the liquid can include water, oil, or some other fluid.

In some implementations, the lower balancer 44 can include an annular cavity 44a having a first cavity, a second cavity, and a third cavity. However, this is merely exemplary, and the number and shape of the annular cavity 44a can be variously modified and applied. For convenience, the following description is based on the illustrated implementation.

The lower balancer 44 includes a first annular housing 441 corresponding to the upper housing and a second annular housing 442 corresponding to the lower housing.

The above-described annular cavity 44a is formed by the internal structure defined by the first housing 441 and the second housing 442.

The first housing 441 and the second housing 442 have an outer shape corresponding to a shape defined by the step portion 422 and enlarged diameter portion 423 of the tub base 42 described above.

More specifically, as shown in FIGS. 4 and 5, the upper outer surface and radially inner outer surface of the first housing 441 are configured to have shapes corresponding to the outer surface shape of the enlarged diameter portion 423 and the outer surface shape of the step portion 422 of the tub base 42.

In addition, the radially inner outer surface of the second housing 442 is configured to have a shape corresponding to the outer surface shape of the step portion 422.

Through the outer surface shapes of the first housing 441 and second housing 442 of the lower balancer 44, a simple fit coupling structure between the lower balancer 44 and the tub assembly as described above can be achieved.

In some examples, the second housing 442 includes an annular locking protrusion 442a extending from the radially inner outer surface toward the radially inner side.

The annular locking protrusion 442a is a portion formed integrally protruding from the second housing 442, and serves to reinforce the strength of the lower balancer 44.

The amount of protrusion of the annular locking protrusion 442a can be limited to a range not in contact with the reinforcement beads 421a-1, 421a-2 in order to prevent interference with the reinforcement beads 421a-1, 421a-2 of the tub base 42 described above.

In addition, as described above, the annular locking protrusion 442a is in direct contact with the lower bottom surface 421-2 of the disk portion 421 of the tub base 42.

Therefore, the contact area between the tub base 42 and the lower balancer 44 can be increased, and through this, the load transferred from the tub base 42 to the lower balancer 44 is distributed to prevent the lower balancer 44 from being damaged.

In some examples, the fastening tab 442b is integrally provided at the radially inner end of the annular locking protrusion 442a.

Figure 7:
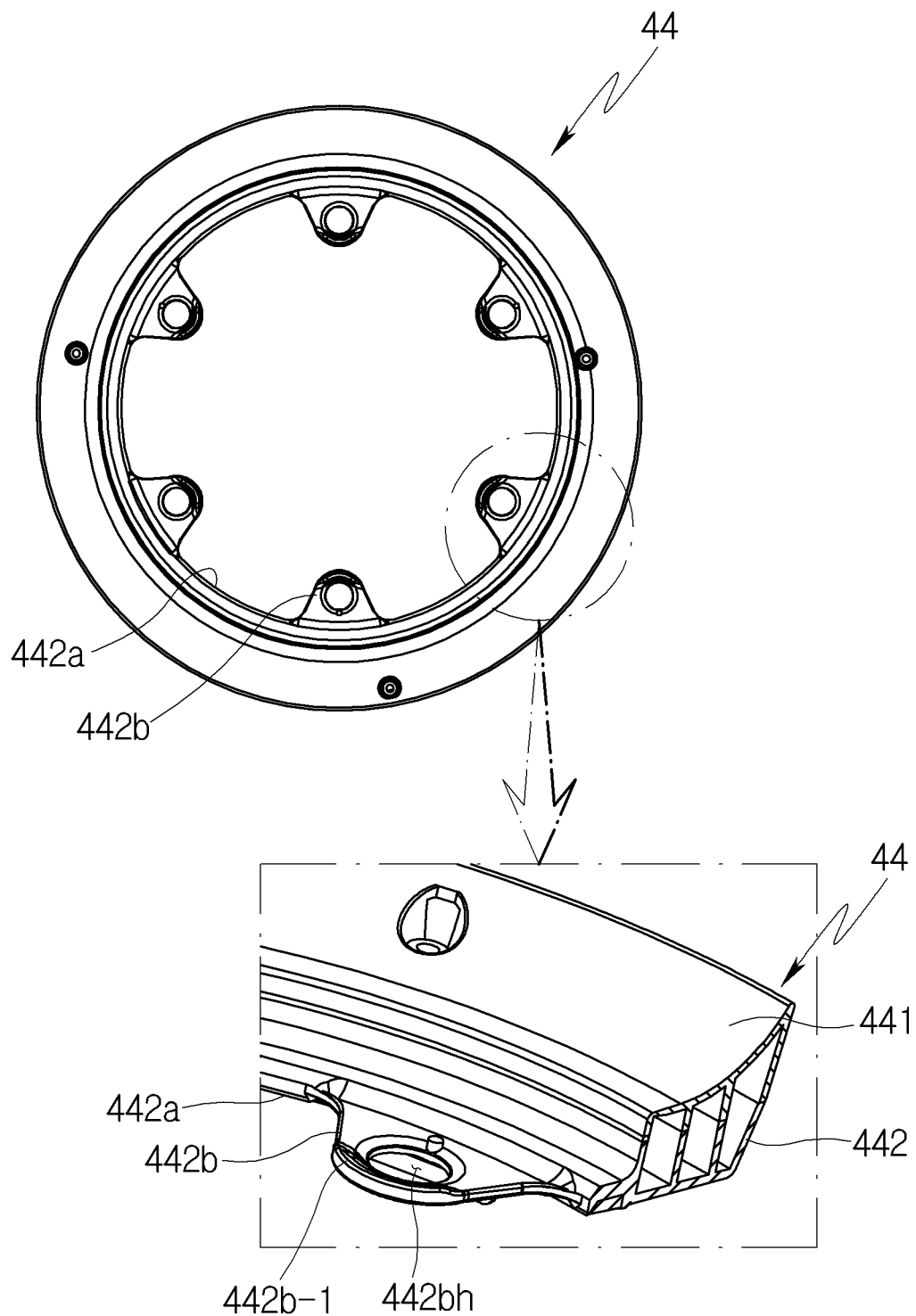
FIGS. 7 and 8 are partial cross-sectional views of FIG. 6.
Figure 8:
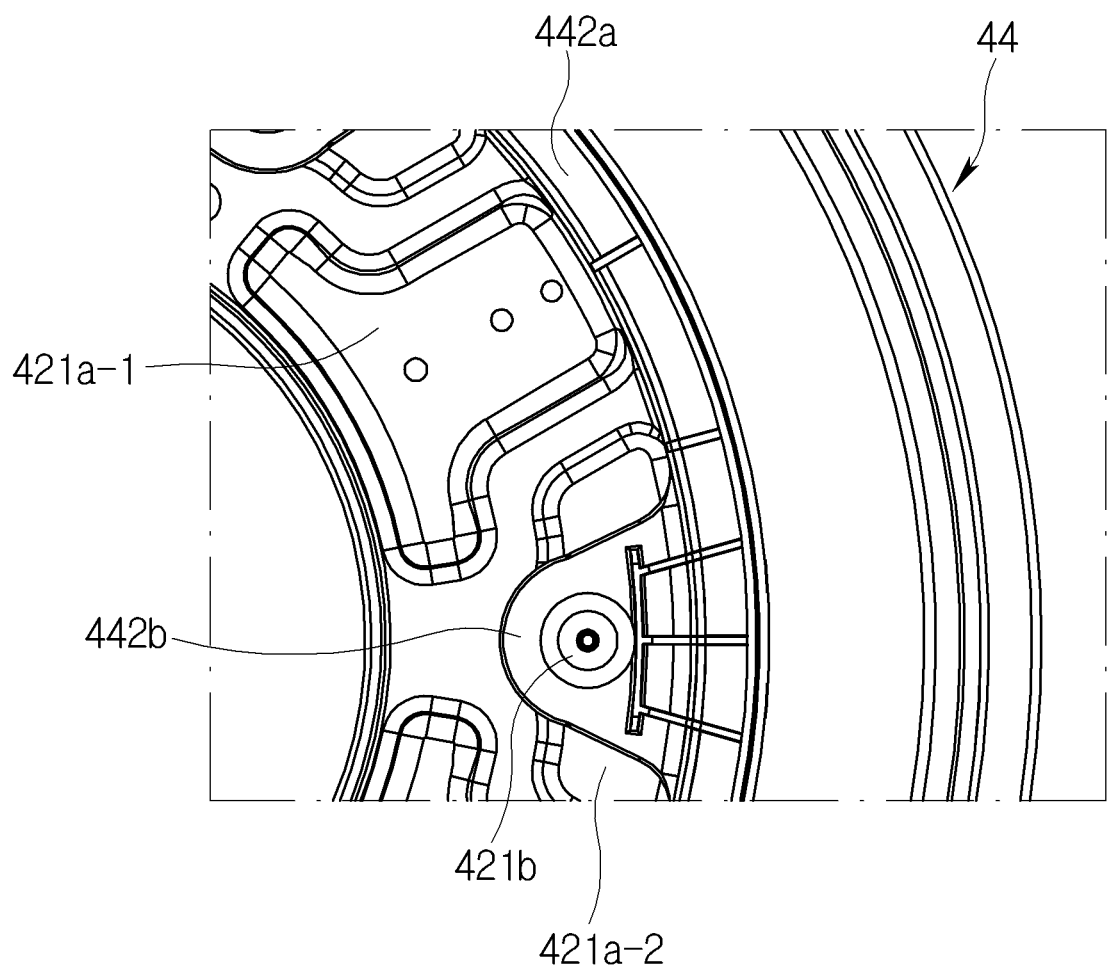

As shown in FIGS. 7 and 8, the fastening tab 442b of the lower balancer 44 is formed to protrude radially inward from the inner end of the annular locking protrusion 442a.

The fastening tab 442b can have a shape in which the width gradually decreases while facing the radially inward as illustrated in order to reduce weight and cost.

The fastening tab 442b is provided with a connection hole 442bh through which the aforementioned connection bead 421b can pass at least partially.

Therefore, when the fastening of the hub 45 to be described later is completed, the connection bead 421b penetrates the connection hole 442bh of the fastening tab 442b and is in close contact with the upper surface of the annular flange 453 of the hub 45.

In some examples, the radially inner end of the fastening tab 442b is formed to have a predetermined inclined surface 442b-1. The inclined surface 442b-1 of the fastening tab 442b has a shape corresponding to the lower outer shape of the connection bead 421b as shown in FIG. 5. Accordingly, the contact area between the fastening tab 442b and the connection bead 421b of the tub base 42 is enlarged, so that there is an effect of dispersing the load transferred from the tub base 42 to the fastening tab 442b.

When the connection bead 421b of the tub base 42 is inserted into the connection hole 442bh of the fastening tab 442b, the temporary assembly between the tub base 42 and the lower balancer 44 is completed.

When the temporary assembly is completed, the hub 45 is coupled to the lower outer surface of the tub base 42.

As described above, the tub base 42, the lower balancer 44 and the hub 45 of the washing machine 100 according to the implementation of the present disclosure are simultaneously fastened through at least one integrated fastening member.

The integrated fastening member can be a fastening bolt (R) which includes a head portion (RH), a body portion (RS) extending in a longitudinal direction from the head portion (RH), and a male screw portion (RT) formed at least partially on an outer circumferential surface of the body portion (RS).

Although the present disclosure is not limited thereto, it will be described based on an implementation in which the fastening bolt (R) is applied as an integrated fastening member as illustrated.

As shown in FIG. 4, the hub 45 is coupled to the lower surface of the tub base 42 in a state where the tub base 42 and the lower balancer 44 are temporarily assembled.

When the hub 45 is coupled, the through hole 421bh of the connection bead 421b of the tub base 42, the connection hole 442bh of the fastening tab 442b of the lower balancer 44 and the fastening hole 453h of the hub 45 are all concentric.

In this case, the body portion (RS) of the fastening bolt (R) is moved downward to extend to the fastening hole 453h through the through hole 421bh and the connection hole 442bh.

The male screw portion (RT) formed on the body portion (RS) of the fastening bolt (R) can be screwed to a female screw portion formed on the inner circumferential surface of the fastening hole 453h of the hub 45 or can be coupled to a separate nut member.

In the illustrated implementation, there is shown a structure for screwing to the female screw portion formed on the inner circumferential surface of the fastening hole 453h of the hub 45, but the present disclosure is not limited thereto, but will be described based on the illustrated implementation.

As the male thread portion (RT) of the fastening bolt (R) is screwed to the female thread portion of the hub 45, the fastening bolt (R) moves while rotating in the downward direction, and the head portion (RH) of the fastening bolt (R) presses the upper bottom surface 421b-1 of the connection bead 421b, thereby bring the connection bead 421b into close contact with the upper surface of the hub 45.

As such, when the fastening bolt (R) is screwed into the fastening hole 453h of the hub 45, as shown in FIG. 5, the simultaneous fastening structure of the tub base 42, the lower balancer 44 and the hub 45 through the single fastening bolt (R) is completed.

In some examples, at least one washer can be disposed between the head portion (RH) of the fastening bolt (R) and the upper bottom surface 421b-1 of the connection bead 421b. FIG. 5 shows an implementation in which a flat washer and a plate washer are simultaneously applied. It is possible to prevent loosening of the screw connection between the fastening bolt (R) and the hub 45 through these washers.

In a structure in which the fastening bolt (R) is screwed with a nut, these washers can be configured to be disposed on the nut side.

FIG. 4 shows an implementation in which a total of two fastening bolts (Rs) are provided, but the present disclosure is not limited thereto, and various modifications are possible according to a coupling strength. In particular, the number of fastening bolts (Rs) is adjustable within a quantity range that maximizes the number of fastening tabs 442b of the lower balancer 44.

In some examples, as described above, the height (h1) of the head portion (RH) of the fastening bolt (R) can be additionally specified in relation to the first depth (d1) of the reinforcement bead 421a-2 and the second depth (d2) of the connection bead 421b.

In some implementations, as shown in FIG. 9, in a state in which simultaneous fastening between the tub base 42, the lower balancer 44 and the hub 45 is completed, the height (h1) from the upper bottom surface 421b-1 of the connection bead 421b to the upper surface of the head portion (RH) of the fastening bolt (R) is set smaller than the sum of the first depth (d1) of the reinforcement bead 421a-2 and the second depth (d2) of the connection bead 421b.

As such, by limiting the height (h1) of the head portion (RH) of the fastening bolt (R), it is possible to prevent interference with the pulsator 50 disposed on the fastening bolt (R).

Further, as in the implementation shown in FIG. 10, in a state in which the simultaneous fastening between the tub base 42, the lower balancer 44 and the hub 45 is completed, the height (h1) from the upper bottom surface 421b-1 of the connection bead 421b to the upper surface of the head portion (RH) of the fastening bolt (R) is set to be smaller than the second depth (d2) of the connection bead 421b.

This can be defined as a state in which the head portion (RH) of the fastening bolt (R) is in direct contact with the upper bottom surface 421b-1 of the connection bead 421b, and in this case, the height (h1) of the head portion (RH) can be the same number as the length of the head portion (RH) in the longitudinal direction of the fastening bolt (R).

In this way, by further limiting the height (h1) or the length of the head portion (RH) of the fastening bolt (R), the height (h1) from the upper bottom surface 421b-1 of the connection bead 421b to the head portion (RH) of the fastening bolt (R) can be minimized. Accordingly, the height of the step portion 422 of the tub base 42 can be minimized, and the overall height size of the inner tub assembly 40 can be reduced.

Figure 11:
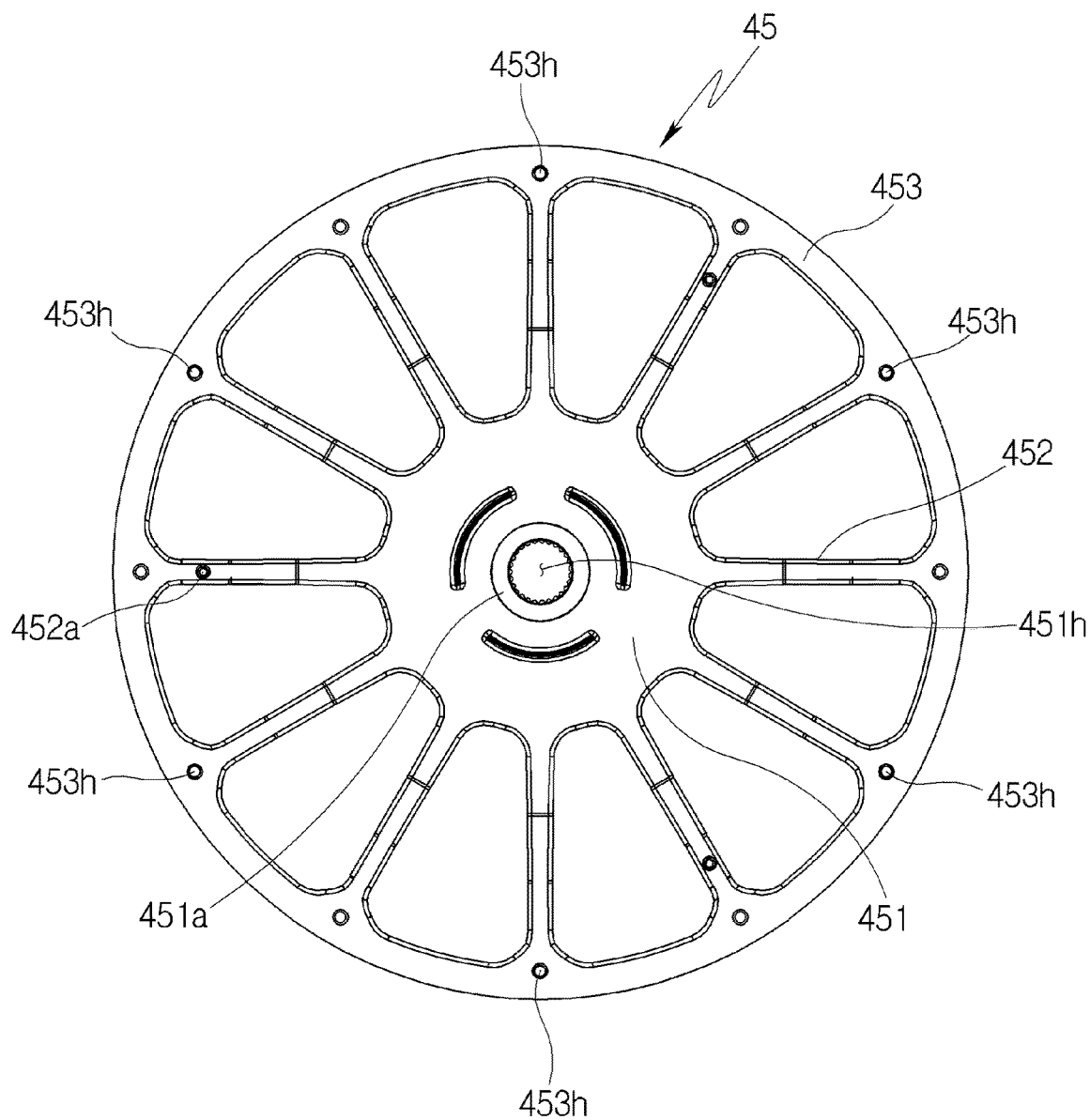
FIG. 11 is a plan view showing an example of a hub.

FIG. 11 shows a top view of the hub 45.

As described above, the hub 45 is disposed between the tub base 42 and the driving unit, and is fixed to the lower outer surface of the tub base 42 through the fastening bolt (R).

A plurality of fastening holes 453h through which the fastening bolt (R) passes is formed in the annular flange 453 of the hub 45, and a female screw portion can be formed on the inner circumferential surface of the fastening hole 453h.

The inner surface of the annular flange 453 is connected to the central portion 451 through a plurality of spokes 452.

A connection protrusion 452a protruding upwardly is formed in some of the plurality of spokes 452. The connection protrusion 452a is inserted into the locking hole 421a-1h formed in the reinforcement bead 421a-1 of the tub base 42. The rotational force transmitted from the hub 45 to the tub base 42 through the connection protrusion 452a can be distributed without being concentrated on the fastening bolt (R).

In some examples, the spline boss 451a can be disposed in the central portion 451, and a spline hole 451h for spline coupling can be defined in the inner circumferential surface of the spline boss 451a.

The teeth of the spline hole 451h are joined to the spline teeth formed on the outer shaft of the driving unit to form a spline coupling.

As such, those skilled in the art to which the present disclosure pertains will understand that the above-described technical configuration of the present disclosure can be implemented in other specific forms without changing the technical spirit or essential characteristics of the present disclosure.

Therefore, the implementations described above are to be understood as illustrative and not restrictive in all respects, and the scope of the present disclosure is indicated by the following claims rather than the foregoing detailed description, and the meaning and scope of the claims and all changes or modifications derived from the equivalent concept thereof should be construed as being included in the scope of the present disclosure.

The invention claimed is:

1. A washing machine comprising:
   a drum configured to receive laundry;
   a tub base fixed to a lower portion of the drum;
   a lower balancer coupled to an outer circumferential surface of the tub base and configured to reduce vibration generated by rotation of the drum;
   a hub coupled to a lower surface of the tub base and disposed radially inside the lower balancer; and
   a fastening member that couples the tub base, the lower balancer, and the hub, wherein the tub base comprises:
- a reinforcement bead that protrudes downward toward the hub, and
- a connection bead that protrudes downward from the reinforcement bead toward the hub, and wherein the fastening member passes through the connection bead and is coupled to the lower balancer and the hub.

2. The washing machine according to claim 1, wherein the fastening member comprises a fastening bolt, the fastening bolt comprising a head portion and a body portion, and
wherein the body portion has a male thread defined on an outer circumferential surface thereof.

3. The washing machine according to claim 2, wherein the tub base comprises a disk portion having a through hole that receives the body portion of the fastening bolt.

4. The washing machine according to claim 3,
wherein the reinforcement bead protrudes downward from the disk portion toward the hub, and
wherein the through hole passes through the connection bead.

5. The washing machine according to claim 4, wherein the lower balancer comprises a fastening tab that extends radially inward from an inner circumferential surface of the lower balancer, the fastening tab defining a connection hole that receives at least a part of the connection bead.

6. The washing machine according to claim 5, wherein the hub defines a fastening hole having a female thread engaged with the male thread of the body portion, and
wherein the head portion is configured to, based on the fastening bolt coupling the tub base, the lower balancer, and the hub, press an upper surface of the connection bead to thereby enable a lower surface of the connection bead to be in direct contact with an upper surface of the hub.

7. The washing machine according to claim 6, wherein the fastening tab comprises an inclined surface that is disposed at a radially inner end of the fastening tab and is in contact with the lower surface of the connection bead, the inclined surface of the fastening tab having a shape corresponding to the lower surface of the connection bead.

8. The washing machine according to claim 6, further comprising a washer disposed between the head portion and the upper surface of the connection bead and configured to restrict movement of the fastening bolt.

9. The washing machine according to claim 6, wherein a first depth of the reinforcement bead protruding downward from the disk portion is greater than a second depth of the connection bead protruding downward from the reinforcement bead.

10. The washing machine according to claim 9, wherein a height from the upper surface of the connection bead to an upper surface of the head portion is less than a sum of the first depth and the second depth.

11. The washing machine according to claim 9, wherein a height from the upper surface of the connection bead to an upper surface of the head portion is less than the first depth.

12. The washing machine according to claim 11, wherein the head portion is in direct contact with the upper surface of the connection bead.

13. The washing machine according to claim 9, wherein a height of the head portion in a longitudinal direction of the fastening bolt is less than the second depth.

14. The washing machine according to claim 13, wherein the head portion is in direct contact with the upper surface of the connection bead.

15. The washing machine according to claim 4, wherein an upper surface of the reinforcement bead is recessed downward from an upper surface of the disk portion such that a lower surface of the reinforcement bead protrudes downward relative to a lower surface of the disk portion, and
wherein an upper surface of the connection bead is recessed downward from the upper surface of the reinforcement bead such that a lower surface of the connection bead protrudes downward relative to the lower surface of the reinforcement bead.

16. The washing machine according to claim 15, wherein a first depth of the reinforcement bead recessed downward from the disk portion is greater than or equal to a second depth of the connection bead recessed downward from the reinforcement bead.

17. The washing machine according to claim 1, further comprising an upper balancer fixed to an upper end of the drum,
wherein each of the upper balancer and the lower balancer comprises a fluid balancer configured to accommodate fluid.

18. The washing machine according to claim 17, wherein the fluid balancer has one or more annular cavities configured to guide the fluid.

19. The washing machine according to claim 1, wherein the lower balancer comprises a fluid balancer that has one or more annular cavities configured to guide fluid.

20. The washing machine according to claim 1, wherein the fastening member passes through the tub base and the lower balancer and is coupled to the hub.

* * * * *